US008228211B2

(12) United States Patent
Gabay

(10) Patent No.: US 8,228,211 B2
(45) Date of Patent: Jul. 24, 2012

(54) ADAPTABLE KEYBOARD SYSTEM

(76) Inventor: Ran Yehoshua Gabay, Chandler, AZ (US)

( * ) Notice: Subject to any disclaimer, the term of this patent is extended or adjusted under 35 U.S.C. 154(b) by 511 days.

(21) Appl. No.: 12/557,576

(22) Filed: Sep. 11, 2009

(65) Prior Publication Data
US 2011/0063141 A1 Mar. 17, 2011

(51) Int. Cl.
*H03M 11/00* (2006.01)
(52) U.S. Cl. ............... 341/22; 341/23; 341/28; 400/484; 400/487; 400/488; 345/168; 345/173
(58) Field of Classification Search .............. 341/22, 341/23, 28; 400/487, 488, 484; 345/168–173
See application file for complete search history.

(56) References Cited

U.S. PATENT DOCUMENTS

| 5,387,042 A * | 2/1995 | Brown ........................... 400/477 |
| 5,936,556 A * | 8/1999 | Sakita ............................. 341/28 |
| 5,954,437 A * | 9/1999 | Wen-Hung .................... 400/487 |
| 6,604,878 B1 * | 8/2003 | Wong ............................ 400/484 |
| 6,714,143 B2 * | 3/2004 | Ideura ............................. 341/23 |
| 7,205,982 B1 * | 4/2007 | Kurosawa et al. ............. 345/168 |
| D551,236 S * | 9/2007 | Pletikosa et al. .............. D14/455 |
| D578,542 S * | 10/2008 | Pletikosa et al. .............. D14/455 |
| 7,595,742 B2 * | 9/2009 | Cozzi et al. ..................... 341/28 |
| 7,630,192 B2 * | 12/2009 | Hung et al. ............... 361/679.08 |
| 2008/0266145 A1 * | 10/2008 | Verma et al. ..................... 341/23 |
| 2009/0278713 A1 * | 11/2009 | Rubanovich et al. ........... 341/23 |
| 2011/0202839 A1 * | 8/2011 | AlKazi et al. ................. 715/703 |

* cited by examiner

Primary Examiner — Linh Nguyen

(57) ABSTRACT

A system for adapting a keyboard display to a definable input language is provided. The system includes an adaptable keyboard comprising keys; a software application, operatively associated with the adaptable keyboard; and a computerized system enabling to receive data from the adaptable keyboard, process and present data and operate the application. Some of the keys of the adaptable keyboard may be language adaptable, where each adaptable key includes a screen enabling to present characters associated with various languages and other data, and a touch-sensing mechanism enabling to identify a typing movement applied onto each the screen, where each screen is operatively connected to the touch sensing mechanism. The software application enables defining a language and adapting the presentation of each character in each of the screens according to the defined language, by controlling the display in the screens.

23 Claims, 5 Drawing Sheets

ADAPTABLE KEYBOARD SYSTEM

BACKGROUND

1. Field of the Invention

The present invention generally relates to input devices and more particularly to keyboards enabling to input text related data in a computerized system.

2. Discussion of the Related Art

Commonly used keyboards and other input devices that enable the input of text characters when using a computerized system, such as a keypad, for example, usually include one or more characters permanently printed upon each key. For example, each key may comprise one or more letters, one or more numbers and/or one or more punctuation marks and/or command symbols.

The presentation design printed or attached to each press key is often limited to a maximum of two characters of two languages (e.g. English Latin characters and Hebrew characters, where each of the letter representing keys include two letters—one of each language. This creates a tremendous limitation both to the user and to the manufacturer.

To switch from one language to another, the user is often required to define the language through his computer program presentation. While the software industry provide support for multiple input languages (far more than just the two enabled by a single keyboard), if the user wishes to use more than two languages he is required to switch between several keyboards.

Additionally, the double presentation of two characters of two different languages over the same key of the keyboard can be confusing for typing, requiring the user only to refer to the character of the key associated with the currently used language.

BRIEF SUMMARY

According to one aspect of the invention, there is provided a system for adapting a keyboard display to a definable input language. The system may comprise: an adaptable keyboard comprising keys; a software application, operatively associated with said adaptable keyboard; and a computerized system enabling to receive data from the adaptable keyboard, process and present data and operate the application, where the computerized system enables operating said software application and is operatively associated with the adaptable keyboard.

At least some of the keys of said adaptable keyboard may be language adaptable, where each adaptable key comprises a screen enabling to present characters associated with various languages and other data, and a touch-sensing mechanism enabling to identify a typing movement applied onto each screen, where each screen is operatively connected to the touch sensing mechanism.

The software application may enable defining a language and adapting the presentation of each character in each of the screens according to the defined language, by controlling the display in said screens.

According to another aspect of the invention, there is provided an adaptable keyboard for adapting a keyboard display to a definable input language, comprising keys, where at least some of the keys of the adaptable keyboard are language adaptable.

Each adaptable key may comprise a screen enabling to present characters associated with various languages and other data; and a touch-sensing mechanism enabling to identify a typing movement applied onto each the screen, where each screen is operatively connected to the touch sensing mechanism.

The adaptable keyboard enables defining a language and adapting the presentation of each character in each the screens of the adaptable keys according to the defined language.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

DETAILED DESCRIPTION

Figure 1:
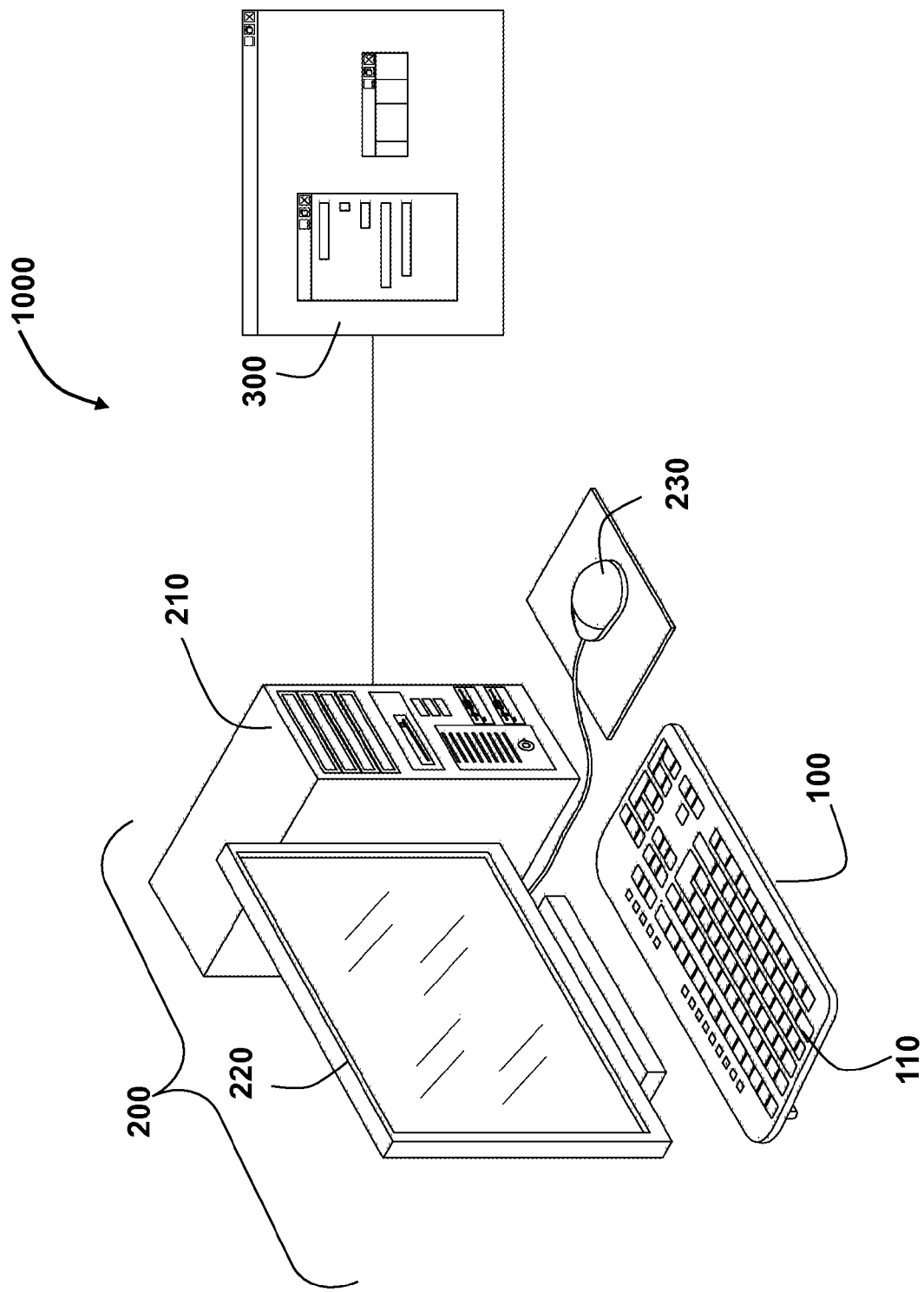
FIG. 1 is a block diagram, schematically illustrating a system for adapting a keyboard display to a definable input language, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways.

Also, it is to be understood that the phraseology and terminology employed herein is for the purpose of description and should not be regarded as limiting. In other modules, well-known methods, procedures, components and circuits have not been described in detail so as not to obscure the teachings of the present disclosure.

The present invention, in some embodiments thereof, provides a system for adapting a keyboard display to a definable input language, to allow a user to select a language for typing and view characters relating to the selected language when using the keyboard for typing.

The characters in the keys may be, for example, letters, numbers or punctuation marks. Each language may have different letters (or symbols in cases of languages such as Chinese or Japanese and the like) and numbers symbols (for example Arabic uses different symbols for representing numbers than English, French or Hebrew). The system may be able to allow adapting each character to the language at use by changing the characters that defer from the previously used language.

Some languages have more letters than others requiring less keys to be used, where each language may have a different number of punctuation marks and other symbols used when writing text. The system enables transforming the presentation of the keys according to all the characters (symbols) required for the selected language.

FIG. 1 is a block diagram, schematically illustrating a system 1000 for adapting a keyboard display to a definable input language, according to some embodiments of the invention. System 1000 may comprise:

an adaptable keyboard 100 comprising keys, where at least some of the keys are adaptable keys 110 enabling to change the presentation of characters according to language selection;

a software application 300, operatively associated with adaptable keyboard 100; and a computerized system 200 enabling to receive data from adaptable keyboard 100, process and present data and operate application 300.

According to some embodiments, computerized system 200 may be any computerized system known in the art such as 210 a PC, a laptop, a PDA, a cellular phone etc.

As illustrated in FIG. 1, computerized system 200 may comprise a computer 210 that enables operating software application 300 and which is operatively associated with adaptable keyboard 100 and other input devices such as a mouse 230 and presentation devices such as a screen 220.

Figure 2:
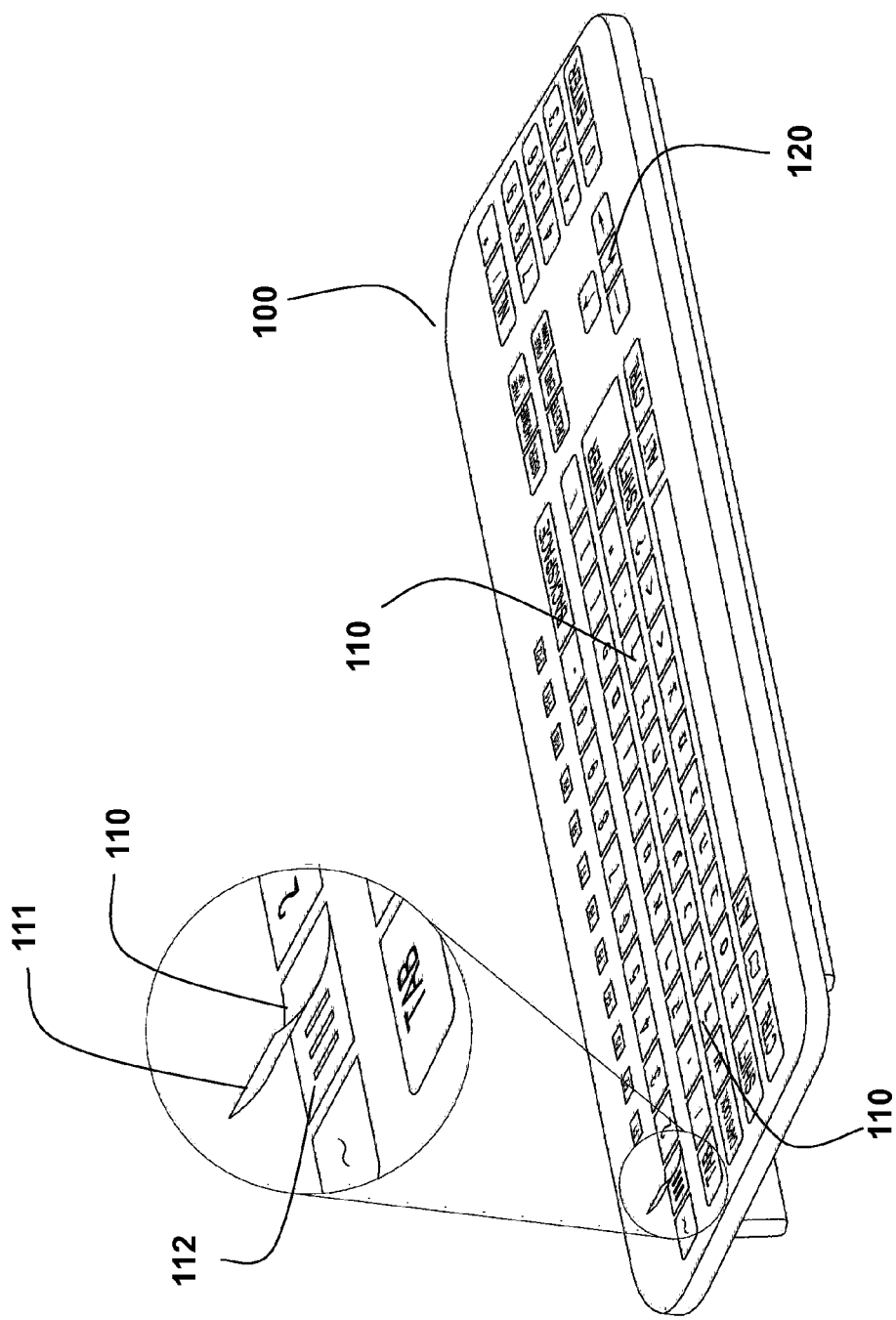
FIG. 2 schematically illustrates an adaptable keyboard of the system for adapting a keyboard display to a definable input language, displaying a Hebrew language representation, according to some embodiments of the invention.
Figure 3:
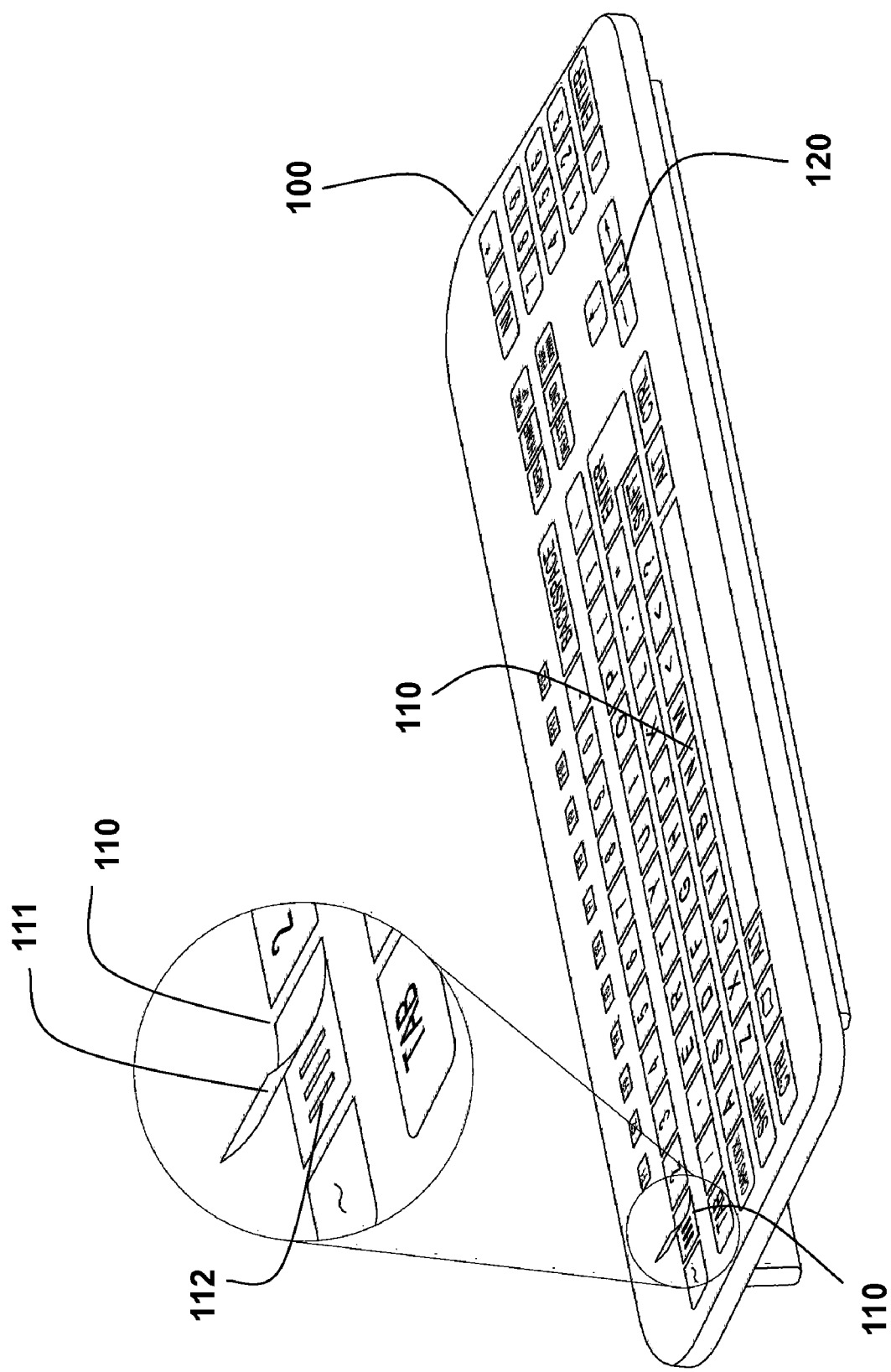
FIG. 3 schematically illustrates an adaptable keyboard of the system for adapting a keyboard display to a definable input language, displaying an English language representation, according to some embodiments of the invention.

FIG. 2 and FIG. 3 schematically illustrate adaptable keyboard 100 displaying a different language representation each (English and Hebrew), according to embodiments as illustrated in FIG. 1.

At least some of the keys in adaptable keyboard 100 may be language adaptable keys 110, while other keys may be non-adaptable keys 120.

Each adaptable key 110 may comprise: (i) a screen 111 permitting the presentation characters associated with various languages and other data thereupon; (ii) and a touch-sensing mechanism 112 permitting the identification a typing movement applied onto screen 111, where each screen 111 is operatively connected to touch sensing mechanism 112 and to software application 300 operated by computerized system 200.

Touch sensing mechanism 112 may be any mechanism known in the art that allows identifying the typing movement of the user over the adaptable key 110. For example, touch sensing mechanism 112 may include a sensor for sensing touch over the adaptable key 110 area.

Each of non-adaptable keys 120 of adaptable keyboard 100 may include a touch sensing mechanism for sensing typing movements of the user upon non-adaptable key 120, where the touch sensing mechanism of non-adaptable key 120 may be the same as the mechanism used in adaptable key 110 or a different mechanism, depending on the manufacturer's requirements.

Screen 111 may be, for example, a Liquid Crystal Display (LCD) screen, a plasma screen, a touch screen, or any other substantially flat screen known in the art that allows electronically presenting of data.

Software application 300 enables defining a language and adapting the presentation of each character in each of adaptable keyboard's 100 screens 111 according to the defined language, by controlling the display of screens 111 through application 300.

Software application 300 may be installed in computerized system 200 to allow controlling the driver of adaptable keyboard 100, thereby controlling the display of screens 111, while receiving input data from keyboard's keys 110 and 120.

Alternatively or additionally, software application 300 may be downloaded from a designated website allowing to update new languages supported by application 300, new graphic designs for characters (e.g. various fonts of characters for each language) etc.

According to some embodiments of the invention, one or more of adaptable keys 110 may be a "shortcut adaptable key" enabling the user to define the specific desired shortcut (e.g. shortcut for connecting to the Internet Explorer, shortcut for cutting and pasting etc.). Each shortcut adaptable key 110 may be defined by the user, using application 300 interface to define both the functionality and the graphical presentation of the shortcut adaptable key 110, where application 300 further enables transforming the adaptable key 110 into a shortcut adaptable key by (i) adapting the presentation and (ii) adapting and defining the functionality of the key according to the user's definitions.

According to some embodiments of the invention, keyboard 100 may further be operatively associated with a security system that permits encoding of the visual on-screen presentation of the typed text, where authorized end user may be able to see the original text decoded by the system, by inputting a security code or through other security means known in the art.

Figure 4:
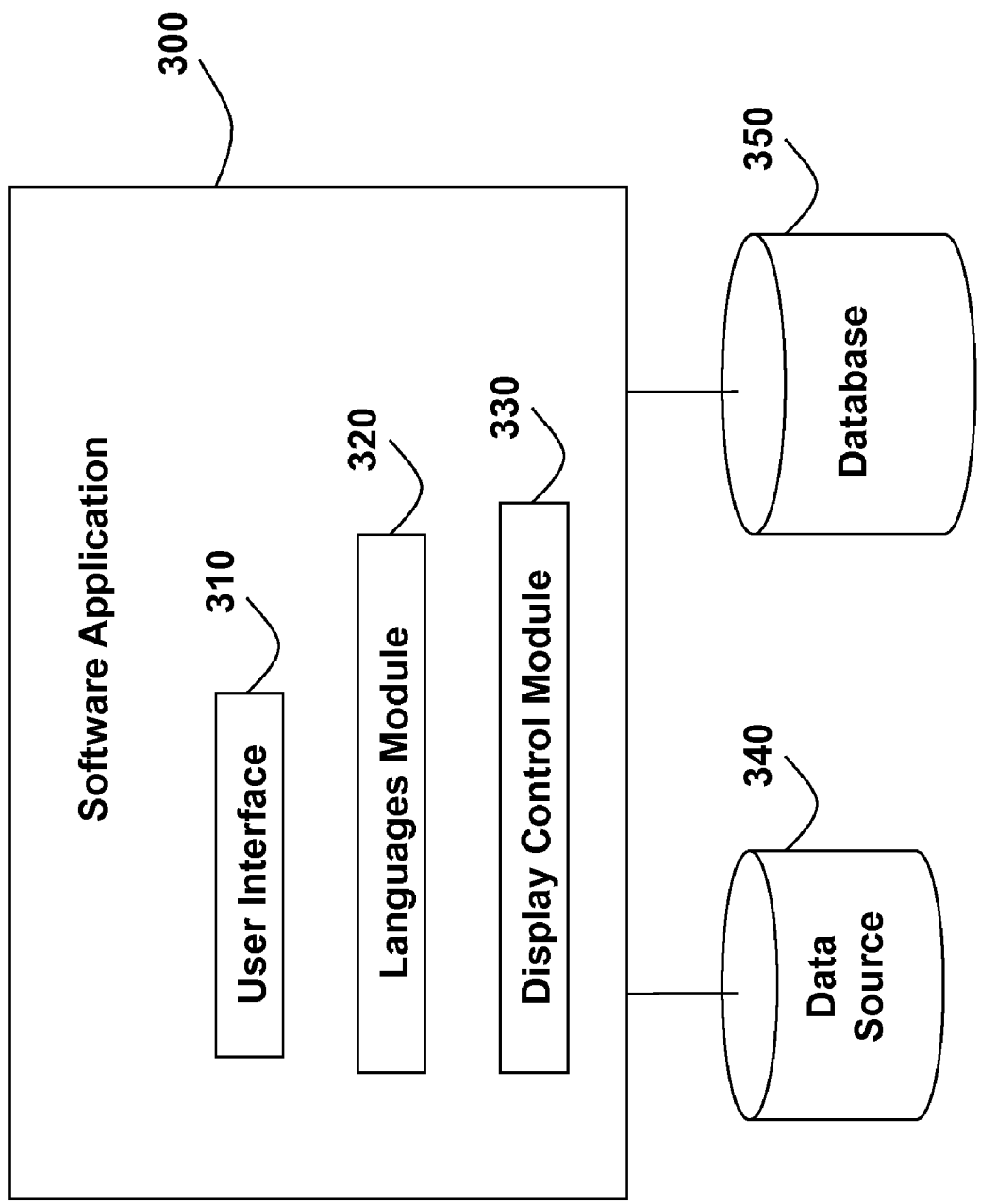
FIG. 4 is a block diagram schematically illustrating a software application of the system for adapting a keyboard display to a definable input language, according to some embodiments of the invention.

FIG. 4 is a block diagram schematically illustrating software application 300, according to some embodiments of the invention. Software application 300 may include:

a user interface 310;

a languages module 320; and a display control module 330.

According to embodiments, user interface 310 may enable users to select a language (e.g., out of a predefined languages list) and other features (such as graphical parameters including fonts of characters) for keyboard presentation, download updates of application 300 etc.

According to embodiments, languages module 320 enables the user to define a languages list for presentation, and add or remove languages from the languages list. Languages module 320 may further enable retrieving languages data from at least one data source 340 for adding new languages to the languages list, thereby allowing to support more languages, dialects etc.; define graphical parameters of the characters of each language (such as fonts, colors of presentation, highlighted/bold characters etc.); and store the languages' characters and parameters in at least one database 350.

According to embodiments, display control module 330 may control the presentation of adaptable keys 110, by adapting the characters presented by adaptable keys 110 to the selected language.

According to embodiments, user interface 310 allows the users to select a language for presentation from the languages list and display control module 330 enables presenting characters of the selected language according to the selected language and according to the defined graphical parameters by retrieving data from database 350.

The size of each adaptable key 110 may be substantially similar to a commonly used ordinary pressing key for allowing the user to use the same typing techniques and habits as he is used to.

The adaptable keyboard may be ergonomic for allowing comfortable and healthy typing for users.

According to other embodiments, all keys in the adaptable keyboard may be adaptable keys including screens, where permanent symbols (such as arrows or mathematical symbols such as minus or plus, are also presented through screens.

Figure 5:
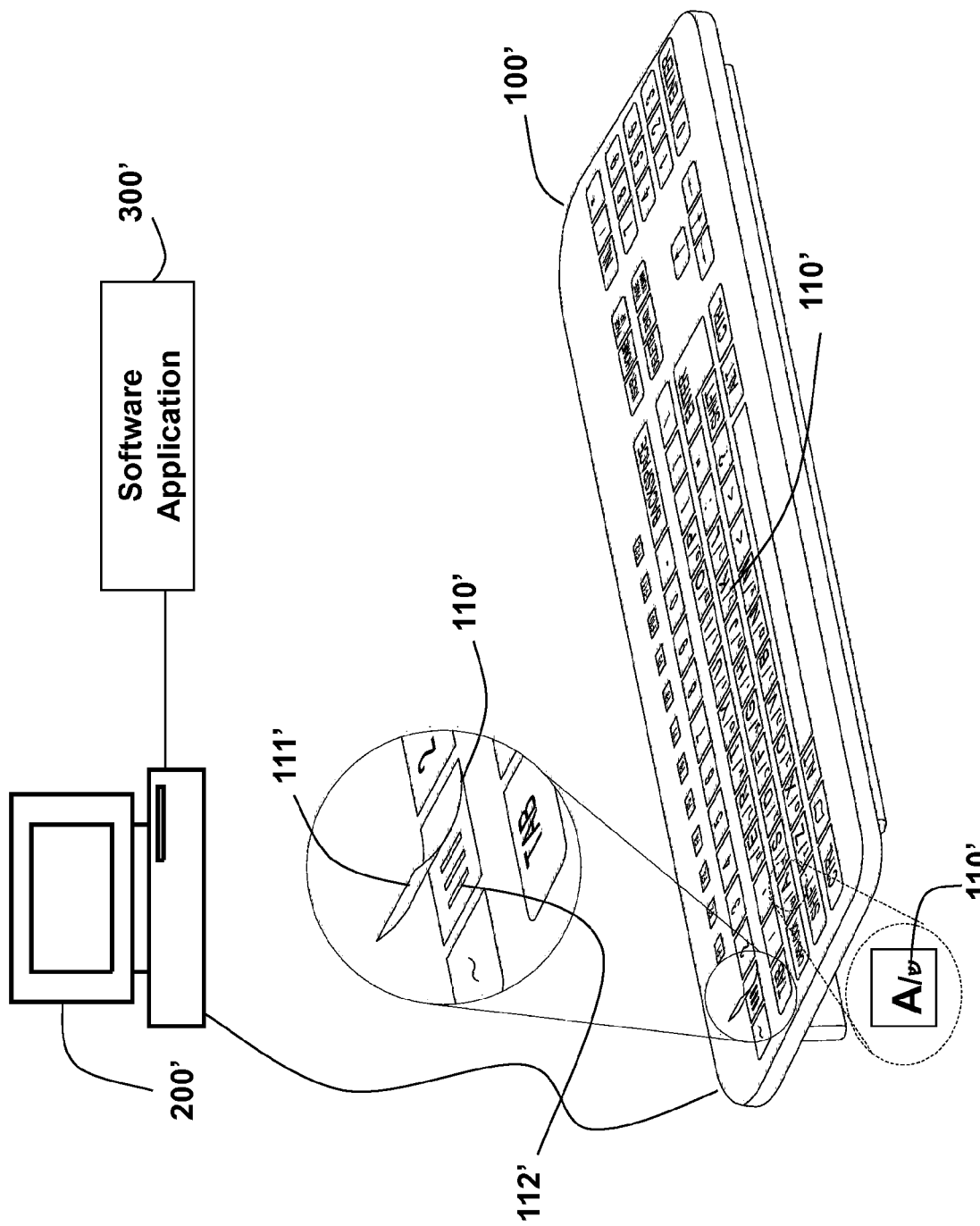
FIG. 5 is a block diagram, schematically illustrating a system for adapting a keyboard display to a definable input language, according to other embodiments of the invention.

FIG. 5 is a block diagram, schematically illustrating a system 1000' for adapting a keyboard display to a definable input language, according to other embodiments of the invention.

According to these embodiments, system 1000' may comprise:

an adaptable keyboard 100' comprising keys, where at least some of the keys are adaptable keys 110' permitting the change of the presentation of characters according to language selection;

a software application 300', operatively associated with adaptable keyboard 100'; and a computerized system 200' enabled to receive data from adaptable keyboard 100', process and present data and operate application 300'.

According to some embodiments, computerized system 200' may be any computerized system known in the art such as a PC, a laptop, a PDA, a cellular phone etc.

Each adaptable key 110' may comprise a screen 111' and a touch-sensing mechanism 112' that enables the sensing touching movement of the user over each adaptable key 110'.

Touch sensing mechanism 112' may include one or more sensors (such as optical sensors, touch sensors based on electric conductivity etc. as known in the art) that enable to sense a touch point(s) as well as to sense the area of touch within the key's 110' area to identify where the touch has occurred in the surface area of screen 111'. To allow this, each adaptable key 110' may include a touch screen permitting the identification of the touch points over screen 111'.

Each screen 111' may enable presenting two characters each character associated with a different language (out of a predefined number of selectable languages), as illustrated in FIG. 5, where one of adaptable keys 110' displays the characters "A" of the English language and the character " " of the Hebrew language upon the same key 110'. One of the languages may be presented by keys 110' in a more emphasized manner e.g. by presenting the characters of the language currently at work in a larger size than that of the other language, to enable a bigger space within the key 110' to be associated with the language at work.

To switch from one language to the other the user may be required to press the smaller character at one of adaptable keys 110', where touch-sensing mechanism 112' may enable identifying a pressing touch movement within the area associated by application 300' to the other language and transmit a signal to application 300' (via computerized system 200') to allow application 300' to enable switching the input language from the currently used one to the other. The switching may include reversing the presentation relations between the characters in each adaptable key 110', where the character that was the largest is reduced in size while the character that was smaller increases in size. The positioning of the characters upon the screen may also be switched.

For example, the user currently types using the English language, in which case the English characters are presented at the right side of each key 110' and are presented as larger than the Hebrew characters, which are positioned at the left side of each key 110'. While typing in English, the user may be required to press upon the right side of adaptable keys 110', at which case touch sensing mechanism 112' enables sensing the typing movements over screens 111' right area and allow transmitting the typed data to computerized system 200'. When the user wishes to switch from English to Hebrew, he/she is required to press on the left side of any of adaptable keys 110', in which case touch sensing mechanism 112' enables sensing a touch at the left area and transmits a signal to computerized system 200' which can be translated by application 300' permitting the triggering of a language switch procedure which enables switching the working language from English to Hebrew and presenting bigger Hebrew characters at the right area of adaptable keys 110' and smaller English characters at the left area of adaptable keys 110'.

Software application 300' may enable the user (e.g. through a designated user interface) to select the two languages that will be displayed and to defined the first language for current work and the secondary "standby" language for easy switching—creating a "short cut" mechanism for switching between the two languages without having to re-enter the interface of application 300' for selecting another language. This mechanism may be efficient for users who constantly work (write) in two main languages and especially (yet not exclusively) for users who use two languages in a single writing session (for example when writing in Hebrew but writing professional terms in the same document in English).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for adapting a keyboard display to a definable input language, said system comprising:
   an adaptable keyboard comprising keys;
   a software application, operatively associated with said adaptable keyboard; and
   a computerized system adapted to receive data from said adaptable keyboard, process and present data and operate said application, wherein said computerized system enables operating said software application and is operatively associated with said adaptable keyboard,
   wherein at least some of the keys of said adaptable keyboard are language adaptable, wherein each adaptable key comprises a screen enabling to present characters associated with various languages and other data, and a touch-sensing mechanism enabling to identify a typing movement applied onto each said screen,
   wherein each screen is operatively connected to said touch sensing mechanism, and
   wherein said software application enables defining a language and adapting the presentation of each character in each said screens according to the defined language, by controlling the display in said screens.

2. The system of claim 1, wherein each screen of each adaptable key includes a Liquid Crystal Display (LCD) screen.

3. The system of claim 1, wherein said software application is installed in the computerized system to allow controlling the driver of the keyboard, thereby controlling the display of the screens, while receiving input data from the keyboard's keys.

4. The system of claim 1, wherein each touch-sensing mechanism includes at least one sensor enabling to sense a pressing movement of a user upon said screen.

5. The system of claim 1, wherein said software application includes:
   a user interface, enabling users to select a language for keyboard presentation; and
   a display control module for controlling the presentation of the keys of the adaptable keyboard, by adapting the characters presented by at least some of said keys to represent characters related to said selected language.

6. The system of claim 5, wherein said software application further comprises a languages module enabling the user to define a languages list for presentation and add or remove languages from the languages list.

7. The system of claim 6, wherein said languages module further enables: retrieving languages data from at least one data source for adding new languages to the list; defining graphical parameters of the characters of each language; and storing said languages' characters and parameters in at least one database,
   and wherein said interface allows the users to select a language for presentation from said languages list and said display control module enables presenting characters of the selected language according to the defined characters graphical parameters of the selected language by retrieving data from said database.

8. The system of claim 7, wherein said graphical parameters include at least one of: a font, a color, highlighting, and bolding.

9. The system of claim 1, wherein all keys of said adaptable keyboard are adaptable keys including said screens and said touch sensing mechanism.

10. The system of claim 1, wherein some keys of said adaptable keyboard are adaptable keys including said screens and said touch sensing mechanism and other keys of said adaptable keyboard are non-adaptable keys including only touch sense mechanisms.

11. The system of claim 1, further enables presenting two characters in each screen of said adaptable keyboard, wherein each character is associated with a different language, wherein each of said two characters is presented at a different side of said adaptable key, wherein said touch-sensing mechanism enables identifying touch areas, to allow determining the character of the language that was typed by the user, and wherein identifying a pressing movement in the area of the character of the other language enables automatically switching from the currently used language to the other.

12. The system of claim 11, wherein the two characters are presented upon each adaptable key in a manner that emphasizes the character of the currently used language.

13. The system of claim 12, wherein the character of the currently used language is presented in a larger size than the size of the character of the other language.

14. The system of claim 1, wherein at least one of the adaptable keys is a shortcut adaptable key enabling the user to define a specific desired shortcut functionality to said shortcut adaptable key, and
   wherein said software application enables the user to define the shortcut functionality and graphical presentation and to transform the adaptable key into a shortcut adaptable key by adapting the presentation to the user's definitions, and by defining the functionality of the key according to the user's definitions.

15. The system of claim 1, wherein said adaptable keyboard is further operatively associated with a security system enabling to encode the visual on-screen presentation of a text typed by a user, wherein an authorized end user is able to see a decoded text of the encoded input text by using security means to view the originally inputted text.

16. An adaptable keyboard for adapting a keyboard display to a definable input language, comprising keys, wherein at least some of the keys of said adaptable keyboard are language adaptable, wherein each adaptable key comprises:
- a screen enabling to present characters associated with various languages and other data; and
- a touch-sensing mechanism enabling to identify a typing movement applied onto each said screen, wherein each screen is operatively connected to said touch sensing mechanism, and wherein said adaptable keyboard enables a user to define a language and adapting the presentation of each character in each said screens according to the defined language.

17. The adaptable keyboard of claim 16, wherein the adaptable keyboard is operatively associated with a software application operated by a computerized system, wherein said software application enables a user to define a working language and adapting the presentation of each character in each of said screens according to the defined language, by controlling the display of said screens.

18. The adaptable keyboard of claim 14, wherein each screen of each adaptable key includes a Liquid Crystal Display (LCD) screen.

19. The adaptable keyboard of claim 16, wherein all keys of the adaptable keyboard are adaptable keys including said screens and said touch sensing mechanism.

20. The adaptable keyboard of claim 16, wherein some keys of said adaptable keyboard are adaptable keys including said screens and said touch sensing mechanism and other keys of said adaptable keyboard are non-adaptable keys including only touch sense mechanisms.

21. The adaptable keyboard of claim 16, further enabled to present two characters in each screen, wherein each character is associated with a different language, wherein each of said two characters is presented at a different side of said adaptable key, wherein said touch-sensing mechanism of each adaptable key enables identifying touch areas, to allow determining the character of the language that was typed by the user, and wherein identifying a pressing movement in the area of the character of the other language enables automatically switching from the currently used language to the other.

22. The adaptable keyboard of claim 21, wherein the two characters are presented upon each adaptable key in a manner that emphasizes the character of the currently used language.

23. The adaptable keyboard of claim 22, wherein the character of the currently used language is presented in a larger size than the size of the character of the other language.

* * * * *